United States Patent [19]
Yamazaki et al.

[11] Patent Number: 5,868,823
[45] Date of Patent: Feb. 9, 1999

[54] WATER-BASED MAGENTA INK COMPOSITION AND INK-JET RECORDING PROCESS EMPLOYING THE SAME

[75] Inventors: Hideto Yamazaki; Masaya Fujioka; Takeo Kitahara; Masahito Kato, all of Nagoya; Shunichi Higashiyama, Yotsukaichi, all of Japan

[73] Assignee: Brother Kogyo Kabushiki Kaisha, Nagoya, Japan

[21] Appl. No.: 743,098

[22] Filed: Nov. 4, 1996

[30] Foreign Application Priority Data

Nov. 16, 1995 [JP] Japan ................................ 7-298414

[51] Int. Cl.⁶ ................................................ C07D 11/02
[52] U.S. Cl. ..................... 106/31.58; 106/31.57; 106/31.27
[58] Field of Search .............. 106/31.58, 31.57, 106/31.27

[56] References Cited

U.S. PATENT DOCUMENTS

| | | | |
|---|---|---|---|
| 4,024,096 | 5/1977 | Wachtel | 106/31.58 |
| 5,016,028 | 5/1991 | Temple | 346/140 R |
| 5,560,771 | 10/1996 | Takamoto et al. | 106/31.58 |
| 5,580,372 | 12/1996 | Gino et al. | 106/31.58 |
| 5,667,569 | 9/1997 | Fujioka | 106/31.58 |

FOREIGN PATENT DOCUMENTS 2-150355  2/1990  Japan .

*Primary Examiner*—Helene Klemanski
*Attorney, Agent, or Firm*—Oliff & Berridge, PLC

[57] ABSTRACT

A water-based magenta ink composition comprises an aqueous medium and a magenta dye dissolved therein, which employs Color Index Number Acid Red 52 as the magenta dye and contains 5 to 15% by weight of a polyhydric alcohol alkyl ether having a vapor pressure of 0.1 mmHg or below at 20° C.

9 Claims, No Drawings

WATER-BASED MAGENTA INK COMPOSITION AND INK-JET RECORDING PROCESS EMPLOYING THE SAME

BACKGROUND OF THE INVENTION

1. Field of the Invention

This invention relates to a water-based magenta ink composition suited for ink-jet recording, and an ink-jet recording process making use of it.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and part or the whole of them is caused to adhere to recording mediums such as paper to make a record.

As ink compositions used in such ink-jet recording systems, those prepared by dissolving or dispersing water-soluble dyes or pigments of various types in water or mixed solvents of water and water-soluble organic solvents are known and put into use. Such ink compositions are required to have various performances most suited for what they are used. For example, they are required to cause no precipitation or aggregation even when unused for a long period of time, to cause no clogging at nozzles and in ink channels of the head of an ink-jet printer and to ensure good print quality. In particular, the performances most required are i) the recording performance or liquid stability that the ink composition does not cause clogging of, and deposits at, nozzles and ink channels of the inkjet printer head when recording is performed using the ink composition, when the recording is paused and also when the recording is stopped over a long period of time, ii) the quick-drying performance that recorded images quickly dry and do not blur even when touched with fingers, iii) the print quality performance that recorded characters, ruled lines and so forth are free from whiskery blurs (i.e., feathering), free from mutual color mixture of different colors at their boundary areas (i.e., bleeding) and formed as sharp images, and iv) the less smelling properties that ink itself less smells.

In comparison between dyes and pigments, the pigments are dispersed in ink mediums without dissolving, whereas the dyes completely dissolve in ink mediums. Hence, dye ink compositions may cause clogging at nozzles and in ink channels of the head of the ink jet printer with difficulty and have much superior liquid stability, compared with pigment ink compositions. Accordingly, many inks for ink-jet printers are dye ink compositions. As such dye ink compositions, water-based dye ink compositions formed of water and dyes dissolved therein are prevalent, and those in which water-soluble dyes having various chemical structures are dissolved in water or mixed solvents of water and water-soluble organic solvents and various additives are optionally added are chiefly used at present.

However, even for such water-based dye ink compositions having been made commercially available, it is difficult to satisfy all the liquid stability, quick-drying performance, print quality performance, stability and less smelling properties. Various improvements are studied but not yet satisfactory. Also, the sharpness and color tone of recorded images may change depending on the type of dyes used. With regard to ink compositions making use of acid dyes capable of giving especially sharp images, they have a poor water resistance. Moreover, among the acid dyes, Color Index Number Acid Red 52 can form magenta color with a sharp and good color tone, and on the other hand especially have a poor water resistance, having a great problem.

SUMMARY OF THE INVENTION

The present invention was made in order to solve the above problems. Accordingly, an object of the present invention is to provide a water-based magenta ink composition that satisfy the sharpness, good color tone, liquid stability, quick-drying performance, print quality performance, less smelling properties and water resistance at the same time, and to provide an ink-jet recording process that may cause no clogging.

The above object can be achieved by the invention described below.

The present invention provides a water-based magenta ink composition comprising an aqueous medium and a magenta dye dissolved therein, wherein the magenta dye is Color Index Number Acid Red 52 and the water-based magenta ink composition contains from 5% by weight to 15% by weight of a polyhydric alcohol alkyl ether having a vapor pressure of 0.1 mmHg or below at 20° C.

The present invention also provides an ink-jet recording process carried out by jetting an ink composition to a recording medium in the form of droplets to make a record, wherein;

The ink composition comprises a water-based magenta ink composition comprising an aqueous medium and a magenta dye dissolved therein; the magenta dye being Color Index Number Acid Red 52, and the water-based magenta ink composition containing from 5% by weight to 15% by weight of a polyhydric alcohol alkyl ether having a vapor pressure of 0.1 mmHg or below at 20° C.

These and other objects, features and advantages of the present invention are described in or will become apparent from the following detailed description of the preferred embodiments.

DESCRIPTION OF THE PREFERRED EMBODIMENTS

The water-based magenta ink composition of the present invention comprises an aqueous medium and a dye dissolved therein, and the dye is limited to a water-soluble dye Color Index Number (hereinafter often "C.I.") Acid Red 52. This dye forms a sharper color than other acid dyes and direct dyes, and provides a good color tone as magenta. Water-soluble dyes are commonly used in conventional ink compositions in such a proportion that the former holds about 0.1 to 10% by weight. In the present invention, however, sufficient color density and sharpness of recorded images can be achieved even when the ink composition is used in an amount of from about 0.1 to 5% by weight.

The polyhydric alcohol alkyl ether having a vapor pressure of 0.1 mmHg or below at 20° C., used in the ink composition in the present invention can effectively accelerate the rate of permeation of ink in recording paper and improve quick-drying performance of ink on paper, to thereby prevent bleeding caused by slow drying of ink on recording paper and also prevent feathering ascribable to permeation of ink. This polyhydric alcohol alkyl ether has also the action to improve water resistance of the above C.I. Acid Red 52.

The reason why the polyhydric alcohol alkyl ether improves the water resistance of C.I. Acid Red 52 is unclear, and is presumed that C.I. Acid Red 52 has so low a solubility in the polyhydric alcohol alkyl ether that, after permeation of ink in recording paper and upon evaporation of water content, the proportion of the polyhydric alcohol alkyl ether in the ink increases to cause precipitation of C.I. Acid Red 52 as solid matter, to make the dye adhere to the recording paper.

As examples of the polyhydric alcohol alkyl ether, it may include diethylene glycol monomethyl ether (0.1 mmHg), diethylene glycol monobutyl ether (0.01 mmHg), diethylene glycol monoisobutyl ether (0.01 mmHg), dipropylene glycol monomethyl ether (0.06 mmHg), dipropylene glycol monopropyl ether (0.02 mmHg), dipropylene glycol monoisopropyl ether (0.05 mmHg), dipropylene glycol monobutyl ether (0.05 mmHg), triethylene glycol monomethyl ether (less than 0.01 mmHg), triethylene glycol monobutyl ether (less than 0.01 mmHg), tripropylene glycol monomethyl ether (0.02 mmHg) and tripropylene glycol monobutyl ether (0.01 mmHg). Here, the indication in parentheses refers to vapor pressure at 20° C.

Commonly available polyhydric alcohol alkyl ethers have a peculiar smell. When any of those having a vapor pressure higher than 0.1 mmHg or below at 20° C. are used in ink, the ink itself may strongly smell, and may cause a great problem in its use in usual offices and homes. However, the polyhydric alcohol alkyl ethers described above have a vapor pressure of as low as 0.1 mmHg or below at 20° C., and may little smell even when used in inks, not causing the above problem.

The polyhydric alcohol alkyl ether may preferably be contained in the water-based magenta ink composition in an amount of from 5% by weight to 15% by weight based on the total weight of the ink composition. If it is in an amount less than 5% by weight, the ink composition may permeate in the recording paper at a low rate to tend to cause problems on drying time and bleeding. If it is in an amount more than 15% by weight, the ink composition may violently permeate into the recording paper, so that the ink composition may strike through the recording paper to the back thereof and often cause the problem of feathering.

The aqueous medium used in the water-based magenta ink composition of the present invention is water, or a mixed solvent of water and a water-soluble organic solvent. Particularly preferably, it may be a mixed solvent of water and a water-soluble organic solvent. The water-soluble organic solvent includes those containing a polyhydric alcohol, having a ink-dry preventive effect. As the water, it is preferable to use not commonly available water containing various ions, but deionized water.

The water-soluble organic solvent used as its mixture with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; glycerol; 2-pyrrolidone; N-methyl-2-pyrrolidone; and 1,3-dimethyl-2-imidazolidinone.

The water-soluble organic solvent may be contained in the water-based magenta ink composition in an amount of usually from 0 to 95% by weight, preferably from 10 to 80% by weight, and more preferably from 10 to 50% by weight, based on the total weight of the ink composition.

When this water-soluble organic solvent is used, the content of the water may be determined within a vast range, depending on the type of component of the water-soluble organic solvent, the composition thereof and the desired properties of ink, and may be within the range of usually from 10 to 95% by weight, preferably from 10 to 70% by weight, and more preferably from 20 to 70% by weight, based on the total weight of the ink composition.

The ink composition of the present invention is basically made up as described above. Besides, various conventionally known additives such as dispersants, surface active agents, viscosity modifiers, surface tension modifiers, pH adjusters and antifungal agents may be optionally added. For example, viscosity modifiers such as polyvinyl alcohol, celluloses and water-soluble resins, surface active agents of various types such as cationic, anionic and nonionic types, and pH adjusters such as diethanolamine and triethanolamine. When an ink composition is prepared which is used in an ink-jet recording process of the type a recording solution is charged, a specific resistance modifier including inorganic salts such as ammonium chloride is added.

The water-based magenta ink composition of the present invention can be produced by any conventional methods. For example, the magenta dye and the polyhydric alcohol alkyl ether are put into the aqueous medium, and the mixture obtained is thoroughly stirred to dissolve them, followed by filtering.

The water-based magenta ink composition of the present invention, obtained in the manner as described above, has well solved the problems involved in the prior art, and for itself has well balanced performances in respect of all of recording performances in ink-jet recording (e.g., signal response, stability in droplet formation, ejection stability, long-time continuous recording performance, and ink ejection stability after long-time pause), storage stability, fixing performance to recording mediums, recorded image lightfastness, water resistance and so forth, and can be useful as ink compositions for ink-jet recording of various systems. Hence, an ink-jet recording process carried out using the water-based magenta ink composition of the present invention by jetting it to a recording medium (e.g., plain paper, coated paper, transparent film) in the form of droplets to make a record is embraced in the present invention as part thereof. In particular, the ink-jet recording process of the present invention can be preferably applied in the ink-jet recording system in which the water-based ink composition is jetted in the form of droplets by utilizing the vibration of a piezoelectric device and also in the ink-jet recording system in which the water-based ink composition is jetted in the form of droplets by utilizing the action of heat energy, the latter being easily affected by the formation of deposits. Thus, the process does not cause clogging at nozzles and in ink channels of the head of the recording apparatus, and also can form good recorded images.

EXAMPLES

The present invention will be described below in greater detail by giving Examples and Comparative Examples. The present invention is by no means limited to the following Examples.

Example 1

To 73 parts by weight of pure water, 2 parts by weight of C.I. Acid Red 52, 20 parts by weight of ethylene glycol and 5 parts by weight of diethylene glycol monobutyl ether (vapor pressure at 20° C.: 0.01 mmHg) were added, and the mixture obtained was stirred for 30 minutes, followed by filtration with a membrane filter of 0.7 μm in pore diameter to obtain a magenta ink composition.

This ink composition was examined on the following T1 to T8, and good results were obtained in all items.

(T1) Long-term stability: The ink composition was hermetically enclosed in a heat-resistant glass bottle, and stored at −30° C. or 60° C. for 6 months. Even after such storage, deposition of insoluble matter was not seen, and changes in liquid properties and color tone were also little seen.

(T2) Ejection stability: Using the shear mode type ink-jet recording head disclosed in Japanese Patent Application Laid-open No. 2-150355, the ink composition was continuously ejected in an atmosphere of 5° C., 20° C. or 40° C., for 24 hours for each. Always stable, high-quality recording was performed in all atmospheres.

(T3) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

(T4) Quality of recorded images: Images recorded on the recording mediums shown below were observed. Magenta images with a high density and a sharp and good color tone were obtained.

Recording Mediums

"ZEROX 4024", woodfree paper available from Zerox Corp.

"SEVEN STAR", woodfree paper available from Hokuetsu Seishi K.K.

"HAKUBOTAN", mechanical paper available from Honshu Paper Co., Ltd.

"TOYO ROSHI No.4", non-sized paper available from Toyo Roshi K.K.

(T5) Fixing performance and quick-drying performance to recording mediums: Five minutes after recording on the recording mediums shown in the above T4, printed areas were rubbed with fingers to judge whether or not any image slip-off and blurs occurred. As a result, neither image slip-off nor blurs were seen, showing a good fixing performance.

(T6) Print quality performance on recording mediums: Print quality of characters and other images recorded on the recording mediums shown in the above T4 was examined. As a result, the images were well free from feathering and bleeding.

(T7) Water resistance: The recorded images obtained in the above T4 were immersed in water for a minute, and then taken out and dried. Thereafter, the recorded images were observed. As a result, color come-off and blurs were only a little seen, and characters and other images were clearly recognizable.

(T8) Less smelling properties: 100 g of the ink composition was weighed and put into a 100 ml beaker made of glass, and a smell thereof was examined. As a result, it was almost odorless.

Example 2

The procedure of Example 1 was repeated to produce a water-based magenta ink composition, except that the diethylene glycol monobutyl ether was replaced with triethylene glycol monobutyl ether (vapor pressure at 20° C.: less than 0.01 mmHg) and its amount was changed to 10 parts by weight. This ink composition was tested similarly, and, like Example 1, good results were obtained in all items.

Example 3

The procedure of Example 1 was repeated to produce a water-based magenta ink composition, except that the diethylene glycol monobutyl ether was replaced with dipropylene glycol monomethyl ether (vapor pressure at 20° C.: 0.06 mmHg) and its amount was changed to 7 parts by weight. This ink composition was tested similarly, and, like Example 1, good results were obtained in all items.

Example 4

The procedure of Example 1 was repeated to produce a water-based magenta ink composition, except that the diethylene glycol monobutyl ether was replaced with tripropylene glycol monomethyl ether (vapor pressure at 20° C.: 0.02 mmHg) and its amount was changed to 12 parts by weight. This ink composition was tested similarly, and, like Example 1, good results were obtained in all items.

Example 5

The procedure of Example 1 was repeated to produce a water-based magenta ink composition, except that the diethylene glycol monobutyl ether was replaced with tripropylene glycol monobutyl ether (vapor pressure at 20° C.: less than 0.01 mmHg) and its amount was changed to 15 parts by weight. This ink composition was tested similarly, and, like Example 1, good results were obtained in all items.

Comparative Example 1

The procedure of Example 1 was repeated to produce a water-based magenta ink composition, except that the diethylene glycol monobutyl ether was not used. This ink composition was tested similarly. As a result, in T5, it permeated slowly, and consequently images blurred when rubbed with fingers. In T6, images were well free from feathering, but serious bleeding was seen. In T7, the ink composition showed a poor water resistance, i.e., serious color come-off and blurs were seen and characters and other images were not recognizable.

Comparative Example 2

The procedure of Example 1 was repeated to produce a water-based magenta ink composition, except that the diethylene glycol monobutyl ether was replaced with ethylene glycol monomethyl ether (vapor pressure at 20° C.: 6.2 mmHg). This ink composition was tested similarly. As a result, good results were obtained in T1 to T7. In T8, however, an intolerable pungent smell was perceived.

Comparative Example 3

The procedure of Example 1 was repeated to produce a water-based magenta ink composition, except that the diethylene glycol monobutyl ether was used in an amount of 1 part by weight. This ink composition was tested similarly. As a result, good results were obtained in T1 to T4 and T7 and T8. In T5, however, the ink permeated slowly, and consequently images blurred when rubbed with fingers. In T6, images were well free from feathering, but serious bleeding was seen. In T7, the ink composition showed a poor water resistance, and characters and other images were not clearly recognizable.

Comparative Example 4

The procedure of Example 1 was repeated to produce a water-based magenta ink composition, except that the diethylene glycol monobutyl ether was used in an amount of 30 parts by weight. This ink composition was tested similarly. As a result, good results were obtained in T1 to T5 and T7 and T8. In T6, however, images were well free from bleeding, but serious feathering was seen. The back of recording paper at the recorded image areas were examined to find that the ink struck through the recording paper to its back.

In the ink compositions of Examples 1 to 5, which showed good ink-jet performance and good sharpness, color tone, liquid stability, quick-drying performance, print quality performance and water resistance and had less-semlling properties, the Color Index Number Acid Red 52 was used as the magenta dye and the polyhydric alcohol alkyl ether having a vapor pressure of 0.1 mmHg or below at 20° C. was contained, in all the cases.

On the other hand, in the ink compositions of Comparative Examples 1 to 4, which showed inferior print quality performance and water resistance, or caused a pungent smell, the ink composition did not fulfill the above conditions in all the cases.

What is claimed is:

1. A water-based magenta ink composition comprising an aqueous medium and a magenta dye dissolved therein, wherein said magenta dye is Color Index Number Acid Red 52 and the water-based magenta ink composition contains no other magenta dye and contains from 5% by weight to 15% by weight of a polyhydric alcohol alkyl ether having a vapor pressure of 0.1 mmHg or below at 20° C.

2. The water-based magenta ink composition according to claim 1, wherein said Color Index Number Acid Red 52 is contained in an amount of from 1% by weight to 5% by weight based on the total weight of the water-based magenta ink composition.

3. The water-based magenta ink composition according to claim 1, wherein said polyhydric alcohol alkyl ether is selected from the group consisting of diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether and tripropylene glycol monobutyl ether.

4. The water-based magenta ink composition according to claim 1, wherein said aqueous medium is a mixed solvent of water and a water-soluble organic solvent.

5. The water-based magenta ink composition according to claim 4, wherein said water is deionized water.

6. The water-based magenta ink composition according to claim 4, wherein said water is contained in an amount of from 10% by weight to 70% by weight based on the total weight of the water-based magenta ink composition.

7. An ink-jet recording process carried out by jetting an ink composition to a recording medium in the form of droplets to make a record, wherein;
    said ink composition comprises a water-based magenta ink composition comprising an aqueous medium and a magenta dye dissolved therein; said magenta dye being Color Index Number Acid Red 52, and the water-based magenta ink composition containing no other magenta dye and containing from 5% by weight to 15% by weight of a polyhydric alcohol alkyl ether having a vapor pressure of 0.1 mmHg or below 20° C.

8. The ink-jet recording process according to claim 7, wherein said ink composition is jetted in the form of droplets by utilizing the vibration of a piezoelectric device.

9. The ink-jet recording process according to claim 7, wherein said ink composition is jetted in the form of droplets by the action of heat energy.

* * * * *